United States Patent [19]
Pope et al.

[11] Patent Number: 5,099,496
[45] Date of Patent: Mar. 24, 1992

[54] ADAPTIVE EQUALIZERS

[75] Inventors: David J. Pope, Blackburn; Anthony S. Merry, Wantirna South, both of Australia

[73] Assignee: OTC Limited, Sydney, Australia

[21] Appl. No.: 579,776

[22] Filed: Sep. 10, 1990

[30] Foreign Application Priority Data

Mar. 6, 1990 [AU] Australia .................... PJ8965

[51] Int. Cl.[5] .............................................. H04L 3/04
[52] U.S. Cl. ........................................ 375/15; 338/18; 364/724.2
[58] Field of Search .................. 375/11, 12, 14, 15; 333/18; 364/724.2

[56] References Cited
U.S. PATENT DOCUMENTS

| | | | |
|---|---|---|---|
| 3,633,105 | 4/1972 | Lender | 375/16 |
| 4,061,978 | 12/1977 | Motley et al. | 375/15 |
| 4,237,554 | 12/1980 | Gitlin et al. | 333/18 |
| 4,344,176 | 8/1982 | Qureshi | 375/15 |
| 4,344,177 | 8/1982 | Kustka | 375/16 |
| 4,453,256 | 6/1984 | Ryu | 375/15 |
| 4,627,072 | 12/1986 | Ryu | 375/14 |
| 4,644,562 | 2/1987 | Kavehrad et al. | 375/15 |
| 4,716,577 | 12/1987 | Oexmann | 375/15 |

*Primary Examiner*—Stephen Chin
*Attorney, Agent, or Firm*—Baker & Daniels

[57] ABSTRACT

A fractionally spaced adaptive equalizer structure provides improved processing speed. Equalization is performed by time-spaced processing arrays, each array having a plurality of elements each performing one of the required complex component multiplication. Particular advantages are achieved in high data-rate low-cost modem design.

5 Claims, 5 Drawing Sheets

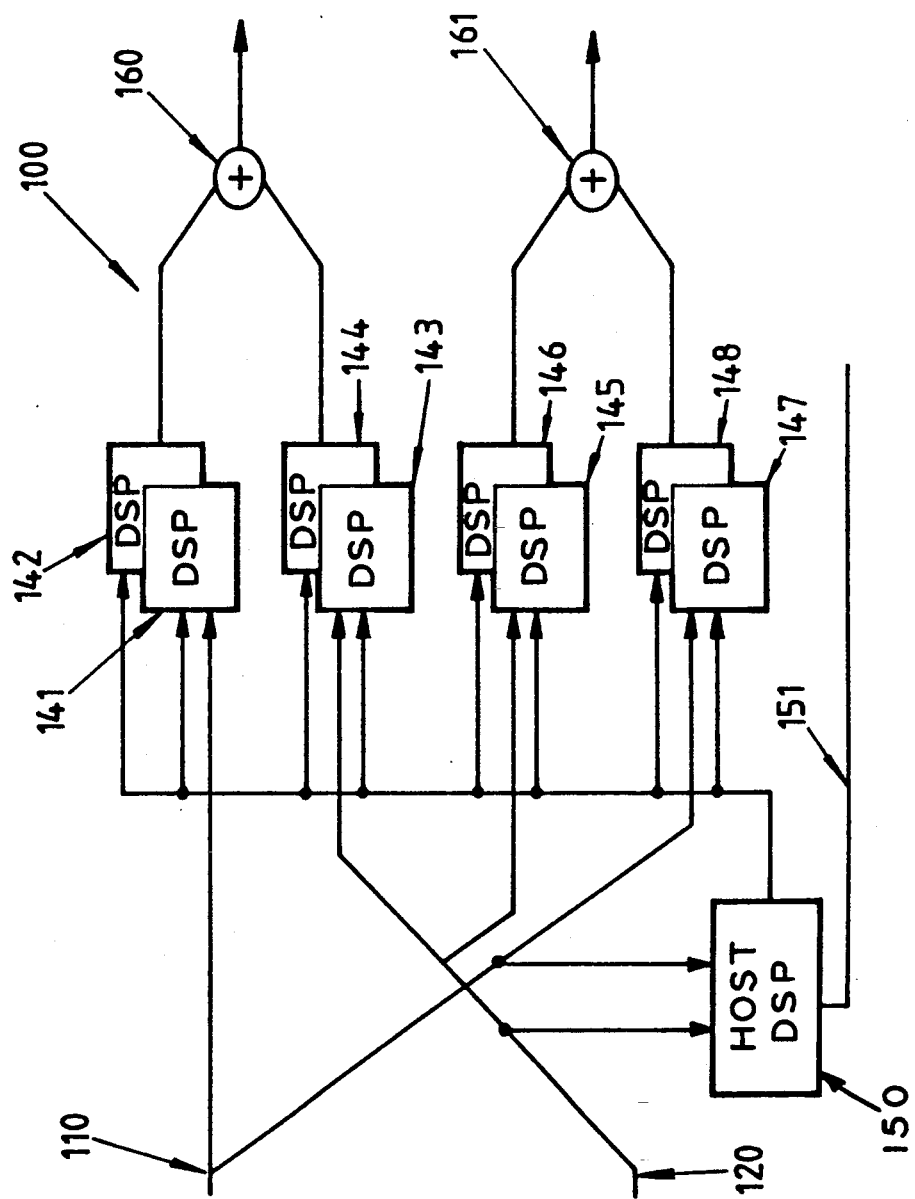

ADAPTIVE EQUALIZERS

BACKGROUND OF THE INVENTION

1. Field of the Invention

This invention relates to modems and in particular to an improved adaptive equaliser for high data rate bandwidth limited applications.

2. Description of the Prior Art

Adaptive equalisers of the fractionally spaced type have previously been proposed for use in modems of various types—see for instance U.S. Pat. No. 4,550,415 to Debus et at. However, a particular problem arises in high speed equalisation, where it is desirable to avoid the use of excessive complexity in components and to avoid undue levels of processing.

SUMMARY OF THE INVENTION

The present invention provides a method of equalisation using parallel computation of algorithm components to reduce the performance required from each component.

According to one aspect, the present invention comprises an adaptive equaliser adapted to receive I and Q inputs and produce I and Q outputs, comprising processing means adapted to equalise said input signals in accordance with a predetermined algorithm, said processing means comprising a plurality of arrays of processing elements arranged such that each array accepts in rotation a set of inputs, another array accepts the next set of inputs, and so forth such that processing occurs at a faster rate than each array alone can achieve;

said equaliser further comprising control means responsive to error signals generated by error generating means in response to said I and Q outputs, said control means generating signals for correcting parameters of said algorithm.

BRIEF DESCRIPTION OF THE DRAWINGS

One embodiment of the present invention will now be described with reference to the accompanying drawings in which:

FIG. 2 illustrates in block form the operation of the adaptive equaliser;

DESCRIPTION OF THE PREFERRED EMBODIMENT

Figure 1A:
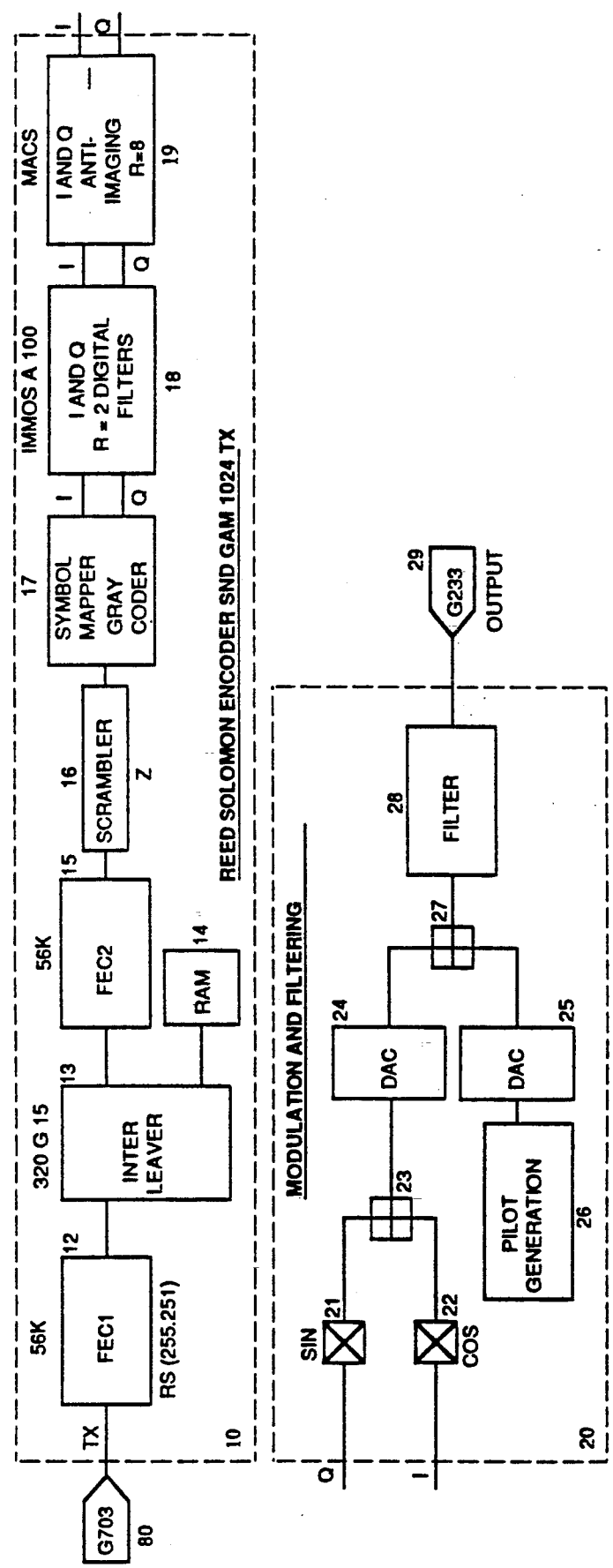
FIG. 1 is an overall schematic diagram of a preferred modem.

The present invention relates to the adaptive equalisation of the various digital signals which comprise the received signal. Particularly in the case of bandwidth limited high-speed modems, speed of equalisation is essential.

The present invention according to this aspect updates the various tap weights in the adaptive equaliser according to the Least Mean Squares algorithm, $$C_{R+1} = C_R + B\, P_R X^*_R \qquad (1)$$

where C=tap weights, B is the stability factor, P is the error signal, X is the data input and the * denotes complex conjugate. Uppercase variables denote column vectors and all subscripted variables are complex.

The present invention seeks to implement equalisation based on the above algorithm by removing as much as possible the slow response caused by serial calculation, and implementing the equalisation by means of a highly parallel structure.

The output signal from the equaliser may be expressed as $$Y_R = C'_R X_R \qquad (2)$$

where ' denotes vector transpose. Expanding equation 2 yields 4 main complex products to be calculated. Further, in the practical implementation, as the equaliser is fractionally spaced on the baud rate, the output must be computed twice per baud.

Referring to FIG. 2, this illustrates schematically the arrangement of one embodiment of the present invention.

The overall equaliser 100 is composed of a total of nine integrated circuit chips, preferably 56K DSP chips. These are more preferably XSP56001RZO DSP chips. 8 chips 41 to 148 perform the task of complex FIR filtering of the signal. Essentially 4 chips (for example 141, 143, 145, 147) each perform a single complex component multiplication T/2 out of phase from the other 4 chips (142, 144, 146, 148). Corresponding components are combined by adders 160, 161 to produce equalised outputs.

Hence, computation power is maximised by the required 58 tap equaliser being structured as 2 time interleaved 29 tap T spaced equalisers with 4 DSPs per T arm. The effective computation rate is 45 million multiplies per second.

The ninth DSP, 150, acts as a host to the bank of 141 to 148, performing the coefficient updating and coefficient loading of the other 8 chips.

Coefficient update of the required speed (input is at 433.5kH$_3$) is difficult to achieve. A single host DSP 150 implements equation 1 as fast as possible, not necessarily at the baud rate. This is achieved by the DSP taking a "snapshot" of a complex data vector, and waiting a few bauds for the associated error signal to arrive from a phase control DSP chip (associated with the error recovery system, not illustrated in detail). When the error signal arrives, equation 1 is evaluated and the new coefficients are loaded into the slaves. A substantial amount of this time is spent loading the new coefficients into the slaves. Thus the sequence of events is that data arrives, the host waits for the associated error signal to be sent from the Automatic Phase Control network, the algorithm is computed, and the coefficients in each DSP chip are updated in proper timing.

Figure 3:
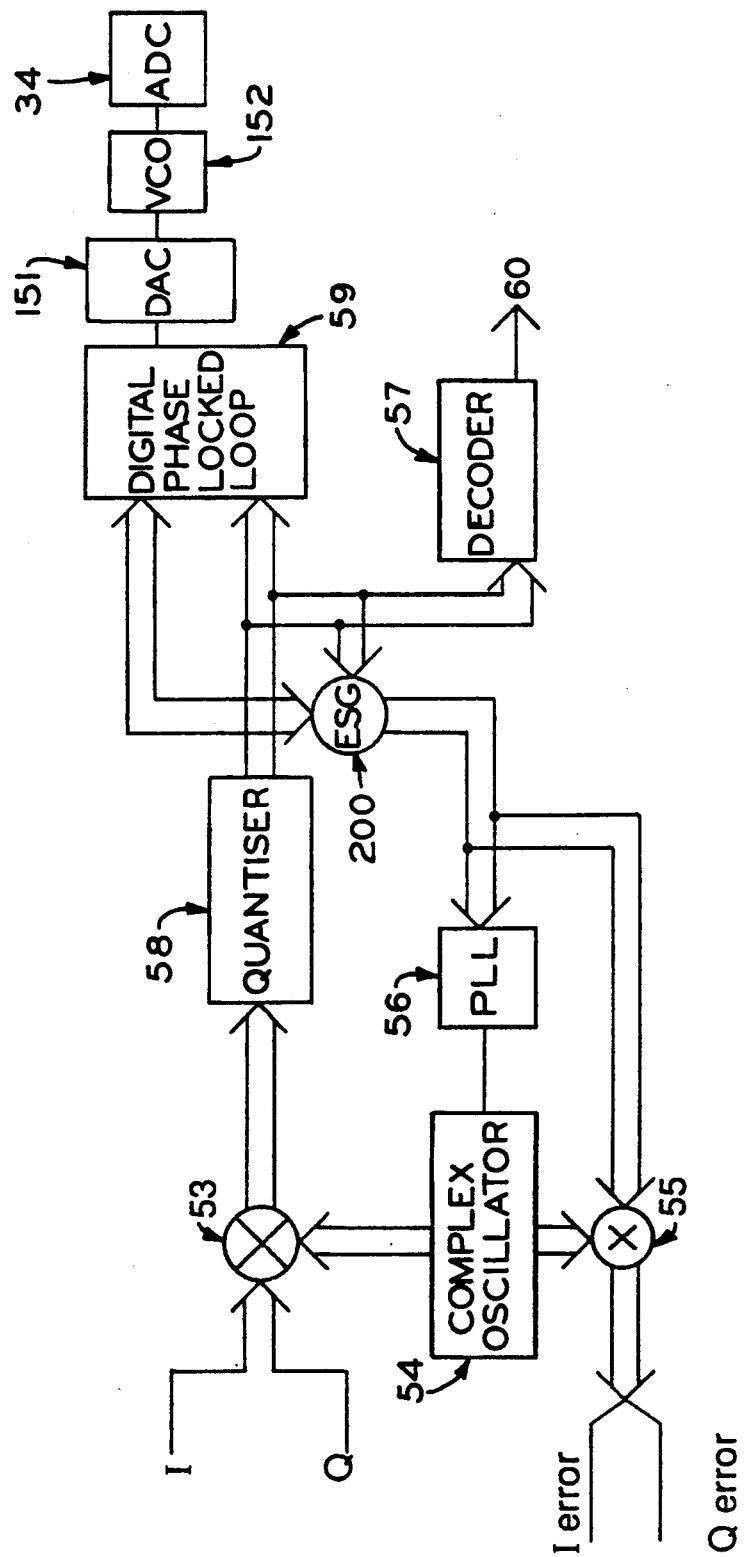
FIG. 3 is a schematic diagram illustrating the generation of error signals for the adaptive equaliser.

The error signal generating arrangements is illustrated in FIG. 3. The I and Q signals enter complex rotator 53, together with a signal from numerically controlled complex oscillator 54, denoting the anticipated phase change. The output is processed in quantiser 58 to produce one of the 1024 points in the constellation. This enters a timing digital phase-locked loop 59, which in turn sends a signal via DAC 157 and voltage controlled oscillator 152 to ADC 34, providing the timing therefor. Quantiser 58 output also enters decoder 57 and is input to block 60.

A further Quantiser 58 output enters error signal generator 200, which sends a signal to phase lockedloop 56. This in turn forms an input to oscillator 54.

Figure 4:
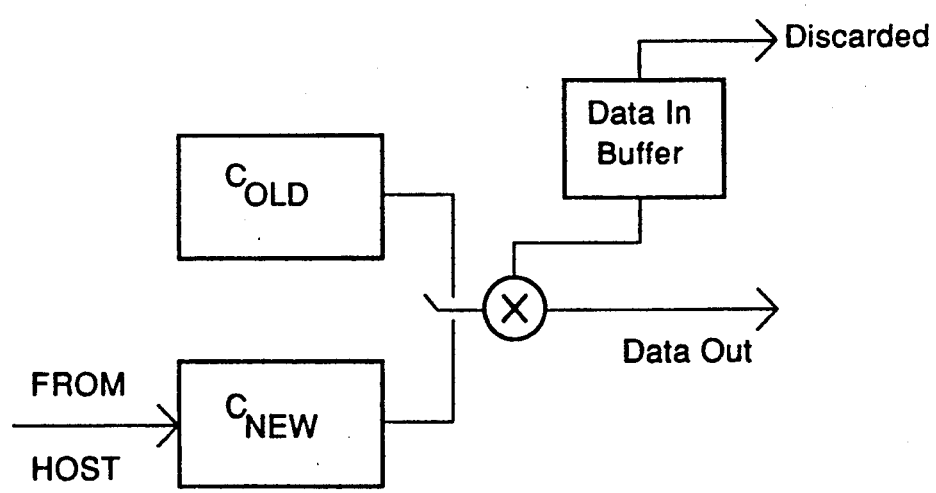
FIG. 4 illustrates the coefficient updating process in the DSP chip components of the adaptive equaliser.

Oscillator 54 outputs into rotator 53 as described above, and also into opposite spin error generator 55. This last component generates the required error signal to correct the detected coefficient errors, as outlined above. The host DSP 150 then computes the new coefficients and transfers them into the slave DSPS 141 to 148 in such a way as to minimise disruption to computation, as is known in the art. This is illustrated in FIG. 4.

The data-in buffer of the DSPs described can be compared with 2 registers, $C_{OLD}$ and $C_{NEW}$. $C_{OLD}$ contains the current coefficients. $C_{NEW}$ is progressively filled and once complete, $C_{NEW}$ is switched to be the current coefficients: the host then commences loading $C_{NEW}$ with a further generation of coefficients.

A particular application of the present invention relates to digital modulation of analog media, in particular wire cables used for long-distance telecommunications.

Previously, analog supergroup channels (240 KHz) were used to carry 60 voice signals only. The illustrative example describes a modem which can transmit 2.048 Mbps data (either digitised voice or raw data) over a standard analog supergroup for long distance applications. This increased flexibility can provide fast turnaround bandwidth efficient 2 Mbps leased lines, or a PCM-30/DCME compatibility without the use of transmultiplexors for voice.

To allow 2.048 Mbps transmission on a channel with 240 KHz bandwidth, incoming data must be encoded using a 1024 point QAM signal constellation. QAM 1024 dictates very histicated signal processing hardware for signal generation and detection which is compounded by the fast transmission rate. To date, the most complex modems built are QAM-256.

GENERAL DESCRIPTION OF EMBODIMENT

The physical system consists of eight multilayer extended double eurocards mounted in a 19 inch sub-rack. Circuit boards were interconnected by a multilayer custom backplane.

Figure 1B:
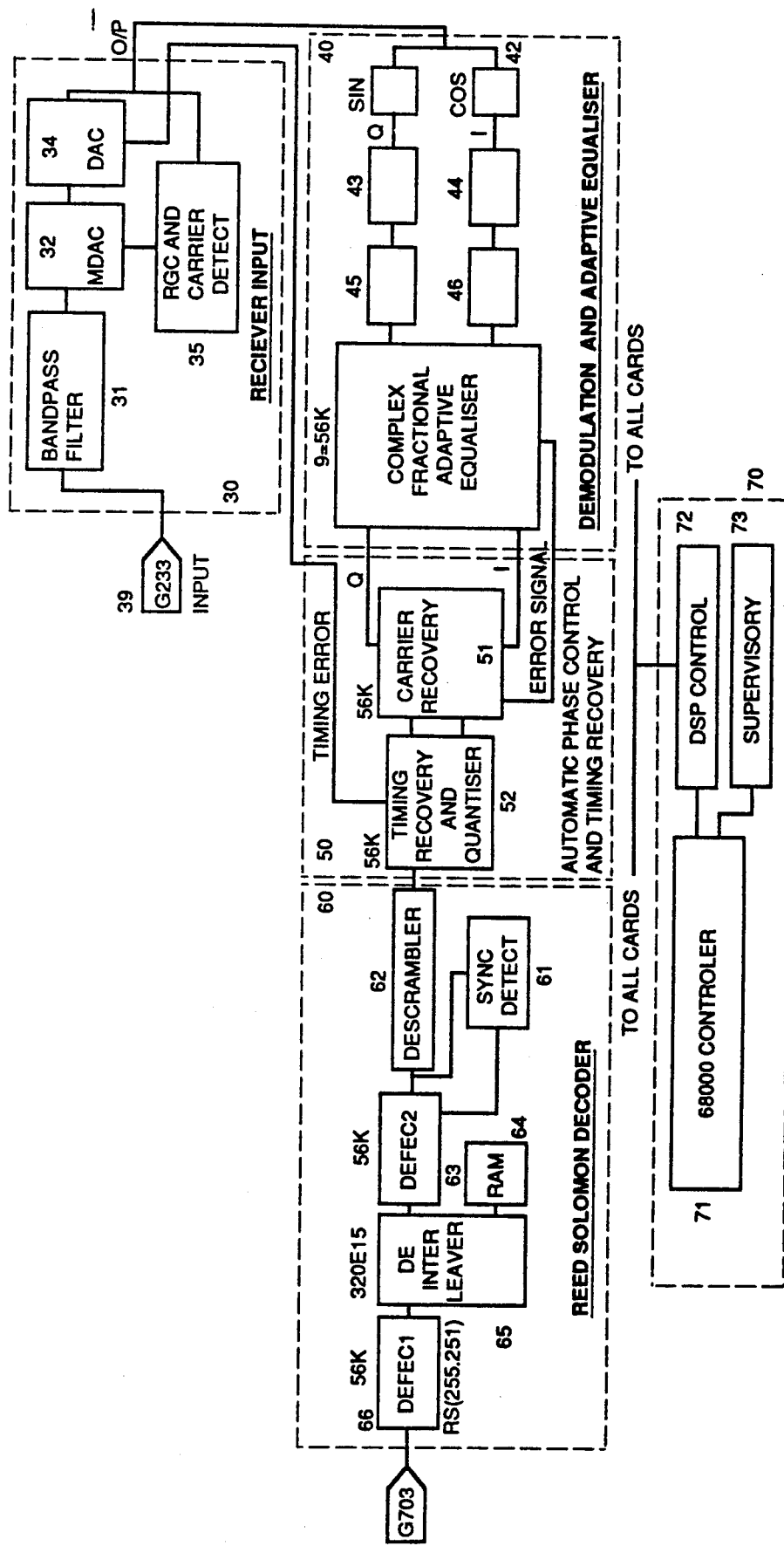

The modem comprises a 1024 QAM transmitter, QAM demodulator, 58 tap fractionally spaced adaptive equaliser, adaptive phase locked carrier and timing recovery, Reed Solomon Forward Error Correction (FEC) system, and 1024 point symbol encoder and decoder. This is illustrated in FIG. 1. These functions are now described on a board by board basis.

Referring to box 10, raw data is collected from the G703 interface 80 and encoded by two concatenated Reed Solomon (RS[255,251]) FEC encoders (12,15). These encoders are designed to process 8 bit Galois Field (GF) symbols. Each encoder consists of a Motorola 56001 DSP (56k) and an EPROM containing GF lookup tables for multiplication of the data by the encoder coefficients. The encoders also add frame synchronisation patterns and link control data which correspondingly increase the link data rate to 2.16 Mbps. Located between the two encoders is a variable rate byte oriented convolutional interleaver 13 implemented using a RAM 14 chip and a TMS32OE15. After coding and interleaving, the data is scrambled 16 and then partitioned into 10 bit data symbols 17. These symbols form an address to two EPROMS which map the symbols into one of 1024 complex Gray coded data points.

The complex data points (in-phase [I] and quadrature [Q]) are then filtered in parallel by interpolating square root raised cosine pulse shaping FIR filters 18 implemented using INMOS A100's. At this point the sampling rate is also converted from 216.75K symbols/sec to 433.5 KHz. The resultant low pass spectrums are then further filtered by a low pass interpolating (and anti-imaging) FIR filter 19 realised using hardware multipliers. The final output sample rate is 3.468 MHz. This is described in more detail below.

Turning to box 20, the modulator card accepts baseband data at a primary sample rate of 3.468 MHz. Both I and Q channels are then hardware multiplied by cosine and sine waves respectively (21,22). Carrier generation is performed using phase table EPROMs with a resolution of 0.01°. The modulated I and Q channels are then added and converted to an analog signal by DAC 24. A pilot is also generated 26 to assist in monitoring functions performed on the cable itself. This is converted to analog by DAC 25 and compounded 27, with the signal from DAC 25. This signal is then filtered by analog Butterworth filters. The resultant signal is then output on a G233 supergroup interface.

Other features of this card are pilot generation, and programmable functions such as: pilot and carrier attenuation, carrier on/off, I and Q on/off, pilot and carrier frequencies.

The initial receiver stage is shown in box 30. The incoming signal is received on a G233 interface 39, bandpass filtered by filter 31. After filtering, the signal is digitised at 1.67 MHz by an ADC 34 with a clock driven by a Voltage Controlled Crystal Oscillator (VCXO). The digitised signal is fed into a 56K 35 which runs carrier detection and Automatic Gain Control (AGC) algorithms. The AGC function is performed by an multiplying APC 34 attached to the 56K. In the present application, the multiplying DAC 32 is preferably a 12 bit unit to provide adequate dynamic range when back off is allowed for.

Referring to box 40, the detected received signal is demodulated by multiplying the signal by sine 41 and cosine 42 carriers to form a complex (I and Q) baseband waveform. The signals are then processed by low pass filters 43, 44 and Square root raised cosine filters 45, 46, matched to the transmitter filters 18, 19. The decimation is analogous to the transmission filter 18, 19 interpolation.

Next, the signal is processed by a 58 tap fractionally spaced complex adaptive equaliser. This is described in more detail above.

After equalisation, the signal is input to a complex phase rotator 51 which corrects for any demodulation frequency or phase errors. Following rotation, the signal is hard quantised 52 to one of 32 levels in the I and Q planes. The input and output of the quantiser are used to form error signals for the adaptive equaliser, the automatic phase control and the timing recovery.

Having recovered the original transmit symbol, the data is then processed by the FEC receiver (63, 64, 65, 66). This system is basically the reverse of that described above. Added discrete hardware 61 is required to extract frame synchronisation pulses for both encoders; the data is then descrambled 62.

The modem has a star type architecture with a 68000 CPU 71 at the hub acting as modem supervisor. Six printed circuit boards (PCB) and nine DSPs form the nodes. Each PCB and DSP is provided with a section of the 68000 address map and are accessed within the given address range through the relevant reprogrammable decoders.

It should be appreciated that the present invention is in no way limited to the modem as described, and other applications will be apparent to the reader. Modifications and variations are possible within the spirit and scope of the invention.

What is claimed is:

1. An adaptive equaliser adapted to receive I and Q inputs and produce I and Q outputs, comprising processing means adapted to equalise said inputs in accordance with a predetermined algorithm, said processing means comprising a plurality of arrays of processing elements, each processing element in an array performing a processing task in parallel with the other elements in its array, wherein each array accepts in rotation a set of inputs, another array accepts the next set of inputs, and so forth such that processing occurs at a faster rate than each array along can achieve;

said equaliser further comprising control means responsive to error signals generated by error generating means in response to said I and Q outputs, said control means generating signals for correcting parameters of said algorithm.

2. An adaptive equaliser according to claim 1 wherein 2 arrays of processing elements are provided T/2 out of phase.

3. An adaptive equaliser according to claim 2, wherein the algorithm is of the Least Mean Square type, and each array of processing elements comprises on element for each complex component multiplication required to be performed.

4. An adaptive equaliser according to claim 3, wherein said control means and said processing elements comprise digital signal processing integrated circuits.

5. A method of adaptive equalisation of the least mean squares type for a QAM received signal using an equaliser comprising;

a first array of processing elements, each element being adapted to perform a complex multiplication of input signals in accordance with a set of stored parameters in parallel with the other elements in said first array;

a second array of processing elements, each element being adapted to perform a complex multiplication of input signals in accordance with a set of stored parameters in parallel with the other elements in said second array;

error signal generating means; and control means;

the method of characterized in that alternate received signals are processed by said first and second arrays, said control means in response to error signals generated by said error signal generating means periodically updating the set of stored parameters and downloading a new set of stored parameters to each processing element.

* * * * *

UNITED STATES PATENT AND TRADEMARK OFFICE
CERTIFICATE OF CORRECTION

PATENT NO. : 5,099,496

DATED : March 24, 1992

INVENTOR(S) : David J. Pope, et al

It is certified that error appears in the above-identified patent and that said Letters Patent is hereby corrected as shown below:

Claim 1, Column 5, Line 4, After "and" insert --Q--.

Claim 3, Column 5, Line 25 Change "on" to --one--.

Signed and Sealed this

First Day of June, 1993

Attest:

MICHAEL K. KIRK

Attesting Officer

Acting Commissioner of Patents and Trademarks